United States Patent [19]
Dettfurth et al.

[11] 4,341,053
[45] Jul. 27, 1982

[54] BUILT-IN CONNECTOR ELEMENT FOR SANDWICH TYPE COMPOUND PANELS

[75] Inventors: Karl Dettfurth; Bernd Dettfurth, both of Hamburg, Fed. Rep. of Germany

[73] Assignee: Messerschmitt-Boelkow-Blohm Gesellschaft mit beschraenkter Haftung, Munich, Fed. Rep. of Germany

[21] Appl. No.: 128,558

[22] Filed: Mar. 10, 1980

[30] Foreign Application Priority Data

Mar. 21, 1979 [DE] Fed. Rep. of Germany ....... 2911058

[51] Int. Cl.³ .............................................. E04C 2/00
[52] U.S. Cl. ........................................ 52/787; 411/82; 411/116; 411/339
[58] Field of Search ............. 52/787; 151/41.7, 41.76, 151/41.73

[56] References Cited
U.S. PATENT DOCUMENTS

3,252,493 5/1966 Smith ................................ 52/787 X
3,313,078 4/1967 Rohe ............................. 151/41.76 X
3,504,723 4/1970 Cushman et al. ................. 52/787 X Primary Examiner—Carl D. Friedman
Attorney, Agent, or Firm—W. G. Fasse; D. F. Gould

[57] ABSTRACT

A built-in connector element is constructed for being anchored in sandwich type compound panels. For this purpose the connector element has a central threading for cooperation with further connector components and a body with corners forming anchoring fins for holding the connector element in the compound panel. The cornered body is arranged substantially concentrically relative to said threading and has a rounded flange merging into the anchoring fins. The anchoring fins are so dimensioned that the circle enclosing the outer corners of the fins has a diameter which is equal or larger than the diameter of the flange. In one embodiment the central threading is provided directly in the cornered body. In the other embodiment a threaded member is laterally displaceable in the hollow cornered body, whereby the initial insertion of a screw is made easier.

11 Claims, 8 Drawing Figures

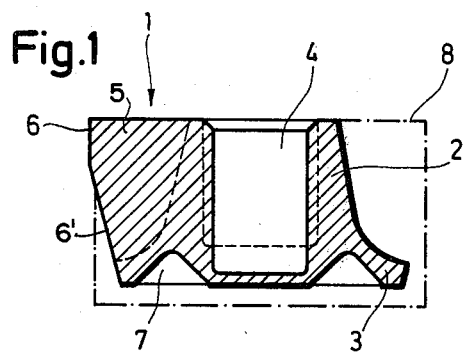
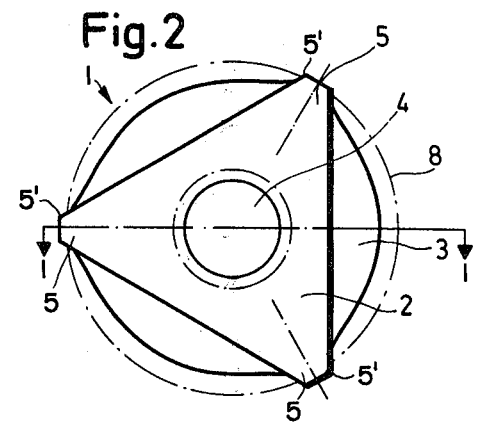
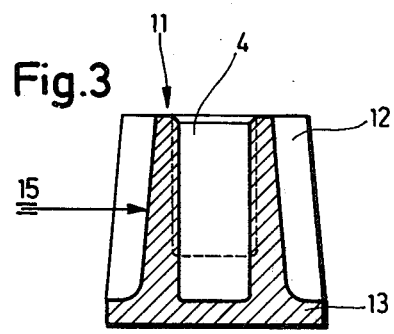
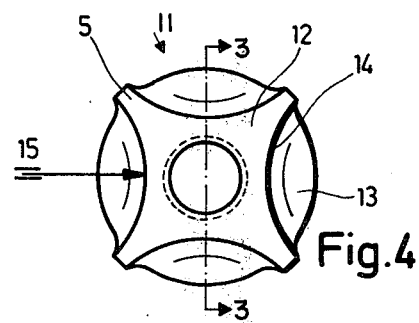
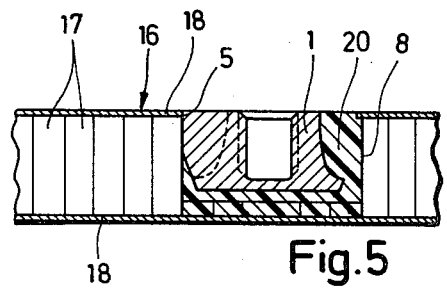
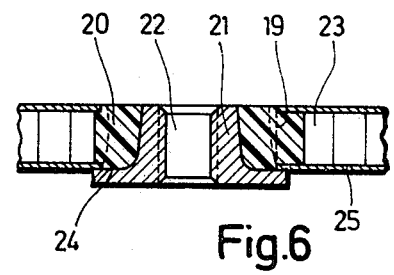

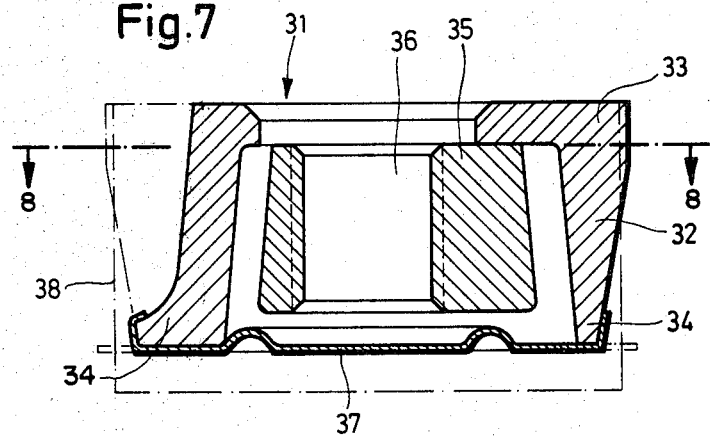
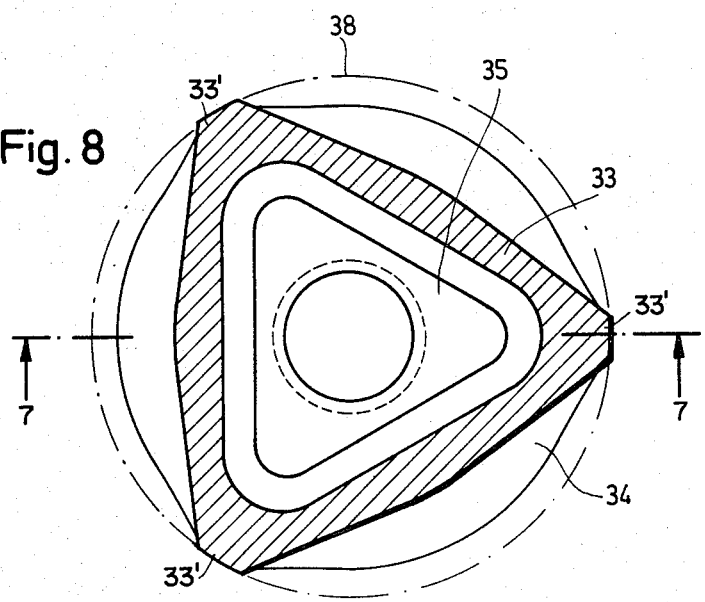

BUILT-IN CONNECTOR ELEMENT FOR SANDWICH TYPE COMPOUND PANELS

BACKGROUND OF THE INVENTION

The invention relates to built-in connector elements for sandwich type compound panels, particularly for panels having a honeycomb core enclosed between two outer cover layers. The connector element is provided with a threaded hole for receiving other connecting elements. The built-in element is held in position in the panel by means of a curable, pourable resin mass and by its anchoring means.

German Patent Publication (DE-AS) No. 1,400,888 describes a built-in element of this type. Such built-in element is referred to as a dowel and comprises a cylindrical body with a dead-end hole. A head flange and a bottom flange are secured to the cylindrical body. The dowel head comprises three anchoring teeth distributed about the circumference. These teeth are supposed to be pressed into the cover layer when the element is installed. The dowel foot has one or several flattened zones, the surfaces of which are supposed to form with the pourable resin mass after its curing a safety catch against torsion loads. Two bores are arranged in the dowel head. One bore serves for introducing the pourable resin mass and the other bore serves for venting and overflow. This type of dowel may be manufactured only at substantial expense and requires several mechanical manufacturing steps. Even if the blank for the dowel is produced, for example as a cast part, it is still necessary to machine at least the two flanges and a ring groove and to drill the two bores in the dowel head and last, but not least, to produce the teeth. The casting itself is also involved because a divided mold is required due to the two flanges.

OBJECTS OF THE INVENTION

In view of the above it is the aim of the invention to achieve the following objects singly or in combination:
- to provide a built-in connector element which will have at least the same installing characteristics as the prior art dowel while simultaneously substantially simplifying the manufacturing steps to thereby reduce the costs of such mass produced items;
- to provide the built-in connector element with such a shape that it may be produced by casting in a single mold even by pressure casting techniques;
- to assure a precision, yet simple installation, preferably with a press fit of the built-in element in the panel;
- to make the holes through which castable, curable resin mass may be poured as large as possible while simultaneously assuring the proper positioning of the element in the panel;
- to increase the ability of the built-in element to resist torque loads and to facilitate the insertion of a screw into the threaded hole; and
- to construct the element in such a manner that the same type of element can be installed in a dead-end hole in a panel or in a through hole through the panel.

SUMMARY OF THE INVENTION

According to the invention there is provided a built-in connector element for sandwich type compound panels which is characterized by a cornered member arranged substantially concentrically relative to a central axis for cooperation with a threaded means. The cornered member forms anchoring fins which merge into a rounded flange, whereby the circle defined by the cornered member has a diameter equal or larger than the diameter of the flange. The threaded means may form a separate insert in a cage type anchoring body.

It is an advantage of the invention that its production has been substantially simplified since the present built-in elements may be produced either by casting in but one mold rather than in a divided mold or the present elements may even be manufactured by pressure casting. Pressure casting has the advantage that the blank may be completed to such an extent that only the threading needs to be cut after the pressure casting. This is possible because the built-in connector element according to the invention has but one flange member and may increase its diameter in a direction away from the flange member.

The installation of the built-in elements into a compound layer panel may be accomplished with great precision in that the installation hole is drilled with a smaller diameter than the outer circle defined by the cornered member. The hole diameter should be smaller by about 0.2 to 0.5 mm than the diameter of the circle defined by the cornered member. Thus, the flattened corners of the cornered member forming anchoring fins may be pressed into the convering layer of the panel to thereby assure a precise position of the built-in element until the curing or hardening of the pourable resin.

A further advantage of the outer shape of the built-in element according to the invention resides in that zones of large cross-sectional area are provided between the side surfaces of the upper end of the cornered member and the outer diameter. Thus, the filling of the these zones with pourable resin may be accomplished substantially faster than with the above described prior art dowel having but a single small filling hole. Due to the downwardly tapering shape of the built-in element the flowing of the pourable resin all around the element is assured. Further, the cornered shape, such as the triangular cornered shape, makes sure that a substantially improved anchoring against torsional loads is achieved as compared to the flattened zones at the foot of the prior art dowel.

The present built-in element is universally usable because it may be installed in a dead-end hole or in a through hole. Thus, the present built-in connector element is easily adaptable to compound sandwich type panels having different structures or different sizes including differing thicknesses.

BRIEF FIGURE DESCRIPTION

In order that the invention may be clearly understood, it will now be described, by way of example, with reference to the accompanying drawings, wherein:

FIG. 1 is a sectional view through one embodiment of a connector element according to the invention, whereby the section extends along section line 1—1 in FIG. 2;

FIG. 2 is a top plan view of the embodiment of FIG. 1;

FIG. 3 is a sectional view of another embodiment of a connector element according to the invention along section line 3—3 in FIG. 4;

FIG. 4 is a top plan view of the embodiment of FIG. 3;

FIG. 5 is a sectional view of a connector element according to the invention installed in a dead-end hole of a panel;

FIG. 6 shows an embodiment installed in a through hole of a panel;

FIG. 7 is a sectional view of a further embodiment in which the threaded means form a component separate from the anchoring body proper, whereby the section plane extends along section line 7—7 in FIG. 8; and FIG. 8 is a sectional view of the embodiment of FIG. 7 along section line 8—8 in FIG. 7.

DETAILED DESCRIPTION OF PREFERRED EXAMPLE EMBODIMENTS AND OF THE BEST MODE OF THE INVENTION

FIGS. 1 and 2 illustrate a built-in connector element 1 having a triangular anchoring body 2 and a flange 3. The flange 3 and the body 2 are arranged coaxially relative to a threaded bore 4 and the body 2 merges into the flange as best seen in FIG. 1. The body 2 has three corners 5 which form anchoring fins, the radially outer ends 5' of which may be flattened as shown or these ends may be rounded. The upper portion 6 of a corner or anchoring fin may extend substantially vertically whereas a lower portion 6' of a corner may slant radially inwardly in a straight or curved manner to merge into the flange 3.

The circle defined by the upper portion 6 of the corners or fins 5 has a diameter slightly larger than the hole 8, which may be a dead-end hole as shown in FIG. 5. The hole 8 is shown by a dash-dotted circle in FIG. 2. Thus, a proper anchoring is assured right from the start even before the pouring of the resin because the corners or fins 5 grip into the panel structure with a press fit. A groove 7 may be provided in the downwardly facing surface of the connector element to increase the surface area which will be in contact with pourable resin if the connector element is inserted into a dead-end hole. Incidentally, the threading in the hole 4 is indicated by dashed lines in FIG. 1 and does not extend all the way down to the bottom of the hole. The diameters of the circle defined by the corners 5 is at least as large or larger than the diameter of the circle substantially defined by the flange 3, please see FIG. 2. FIGS. 3 and 4 illustrate a connector element 11 having an anchoring body with four corners 5 forming anchoring fins 12 and with a flange 13. The anchoring body with its anchoring fins 12 merges into the flange 13, whereby the side walls 14 between the fins 12 have a convex shape, thereby providing large cross-sectional zones for the pouring of the resin into the spaces between the fins 12. A central, threaded hole 4 is provided just as in the embodiment of FIGS. 1 and 2. A pressure applied in the direction of the arrow 15 provides for a stop nut function to secure any screw element as it is screwed into the threaded hole 4. A narrowing of the threaded diameter of the hole 4 in one direction as indicated in FIG. 3 and FIG. 4 is usually sufficient, however, a slight narrowing of the threaded diameter may be provided on several sides rather than at least on one side.

Both embodiments shown in FIGS. 1 and 2 as well as in FIGS. 3 and 4 may be provided with threaded through holes rather than with the threaded dead-end holes 4 as shown. In that instance, the lower open end of the hole will be temporarily closed, for example by a piece of tape, prior to the pouring of the resin.

FIG. 5 shows a sectional view through a panel portion 16 with a dead end hole 8 and with a connecting element 1, for example, embedded in the dead-end hole by means of curable, poured resin 20. The panel 16 has outer covering sheets 18 and a honeycomb core 17 between the outer covering sheets 18. As mentioned, in the assembly the dead-end hole 8 is first drilled with a diameter slightly smaller than that of a circle defined by the corners 5. Then, the built-in element is pressed into position by a suitable tool not shown, or manually. Thereafter, the initially hollow spaces between the side walls of the anchoring body and the adjacent panel core is filled with a pourable resin 20 which also fills the open honeycomb spaces which have been opened by the drilling of the hole. By making the outer diameter of the corners 5 a little larger than the diameter of the hole 8, it is assured that the element is held in place even during the pouring of the resin 20 and such position is maintained and enhances the holding power even after the curing of the resin. Thus, after the hardening or curing of the resin 20 the built-in element is secured against tension and pressure forces as well as against torque loads due to the outer configuration of the anchoring body.

FIG. 6 illustrates the installation of a built-in element 21 which corresponds in its outer configuration to the element 11 except for the threaded screw hole 22. The element 21 is inserted into a through hole 19 in a relatively thin sandwich panel 23. As in FIG. 5, the top end of the built-in element is flush with the upper cover surface of the panel. When the element 21 is pressed into the through hole 19 with a press fit, the upwardly facing surface of the flange type member 24 rests against the cover layer 25 of the panel 23 and the resin 20 again fills the spaces between the radially outer walls of the anchoring body of the elements 21 and the spaces in the cut open adjacent honeycomb portion of the panel 23. If desired, a gasket type of sealing foil may be inserted between the flange 24 and the cover sheet 25 of the panel. Such gasket may have a tacky surface on both sides so as to stick to the flange as well as to the cover surface or layer 25. After the resin 20 has hardened, a screw may be screwed into the hole 22 from either side.

FIGS. 7 and 8 illustrate a built-in element 31 corresponding substantially in its outer shape to the triangular shape of the element 1. The element 31 may thus be installed into a sandwich type panel, in the same manner as shown in FIGS. 5 and 6. The element 31 comprises, however, three initially separate components, namely, an outer cage type member 32 forming a triangular anchoring body 33 with anchoring corners 33'. The anchoring body 33 merges into a flange type member 34. The cage member 32 is hollow and holds a threaded member 35 having a threaded hole 36. The threaded hole 36 passes entirely through the threaded member 35 as shown. However, a dead-end threaded hole is also feasible for the embodiment of FIGS. 7 and 8. The threaded member 35 is prevented from falling out of the hollow cage 32 by a cover 37 such as a sheet metal cover. The hole to be drilled in a panel is indicated by the dash-dotted lines 38 in FIGS. 7 and 8. Here again a press fit would be assured for the corners 33' by making the hole 38 slightly tighter.

Although the illustrated embodiments show an anchoring shape with three or four corners, it is within the teachings of this invention to modify the anchoring body as well as the flange member so as to accommodate, for example, specially constructed and arranged layers in compound panels.

Although the invention has been described with reference to specific example embodiments, it is to be understood, that it is intended to cover all modifications and equivalents within the scope of the appended claims.

What is claimed is:

1. A connector element adapted for anchoring into a sandwich type compound panel, comprising a single piece body having a central opening and anchoring means in the form of anchoring fins extending integrally and radially out of said single piece body, said anchoring fins extending substantially concentrically relative to said central opening for holding said connector element in said panel, threaded means in said central opening of said single piece body, said single piece body further comprising an upper part with fin corners formed by said anchoring fins, said single piece body further comprising a single substantially rounded flange located as an integral part of said single piece body opposite said fin corners, said anchoring fins merging into said lower substantially rounded single flange, said fin corners defining a first circle having a given diameter, said first circle extending concentrically with said central opening, said single flange defining a second circle, said given diameter of said first circle being equal to or larger than said second circle, whereby said anchoring fins merge into said lower flange.

2. The connector element of claim 1, wherein said anchoring fins have a multi-cornered cross-section.

3. The connector element of claim 2, wherein said multi-cornered cross-section comprises corners with flat surfaces facing radially outwardly and with side surfaces which are curved radially inwardly.

4. The connector element of claim 1, wherein said threaded means comprise a bore extending completely through said body and at least partially into said single flange, said bore being threaded at least along part of its length.

5. The connector element of claim 4, wherein said bore extends also completely through said single flange.

6. The connector element of claim 1, wherein said fin corners of said anchoring fins defining said first circle have a first fin portion with a constant diameter corresponding to that of said first circle, and a second fin portion between said first fin portion and said single flange, said second fin portion tapering toward said single flange from said first fin portion.

7. The connector element of claim 1, wherein said body comprises surface areas which taper or curve toward said single flange.

8. The connector element of claim 1, wherein said single flange comprises a groove (7) extending axially inwardly and substantially around said central axis.

9. The connector element of claim 1, wherein said threaded means comprise lateral stop means for providing a stop nut effect.

10. The connector element of claim 1, built into a dead-end hole in said sandwich type compound panel, said dead-end hole having such a depth that the built-in connector element extends flush with an outer panel surface.

11. The connector element of claim 1, built into a through hole in said sandwich type compound panel, whereby said flange means extend in parallel with an outer panel surface.

* * * * *